United States Patent
Bertrand

[15] 3,660,745
[45] May 2, 1972

[54] DEVICE FOR ADJUSTING THE MEASUREMENT RANGE OF CAPTORS FITTED WITH FORCE BALANCES PARTICULARLY FOR PRESSURE CONVEYORS

[72] Inventor: Pierre Claude Bertrand, Pau-Billere, France

[73] Assignee: Compagnie Des Compteurs, Paris, France

[22] Filed: June 5, 1970

[21] Appl. No.: 43,849

[30] Foreign Application Priority Data

June 19, 1969 France.................................6920508

[52] U.S. Cl. ............................318/676, 73/398 R, 73/407, 318/645, 318/687

[51] Int. Cl. ....................................................G01l 9/10

[58] Field of Search....................73/398 R, 407, 141, 141 R; 336/30; 177/212; 346/32; 317/155.5; 318/645; 316/676, 687

[56] References Cited

UNITED STATES PATENTS 3,350,945  11/1967  Bristol ...................................73/398
3,376,482  4/1968  Barthel................................318/676

Primary Examiner—Donald O. Woodiel
Attorney—Pierce, Scheffler & Parker

[57] ABSTRACT

The device comprises a force balance including several windings, switches being provided for selective connection of any of the windings in the circuit of the force balance to compensate for different ranges of measurement.

6 Claims, 2 Drawing Figures

DEVICE FOR ADJUSTING THE MEASUREMENT RANGE OF CAPTORS FITTED WITH FORCE BALANCES PARTICULARLY FOR PRESSURE CONVEYORS

In many technical fields and, more particularly, in force balances of the type which are designed for the measurement of differential pressures, it is highly desirable that a given equipment may be regulated without being subject to constructional alterations, and this, while said equipment is so conceived that it may be used with the same accuracy for the measurement of different scale magnitudes. This is the case, particularly, with measurement devices for differential pressures wherein the equipment must often be able to work within quite different ranges, whether similar mass produced equipments are used in some parts of plants wherein prevail different conditions, or that one equipment only is to be used seriatim for the measurement or for the detection of said different magnitudes.

The invention has been conceived and developed to provide a new device for adjusting the measurement range of apparatus fitted with force balances, whereby it is possible to make measurements, checkings or other operations relating to magnitudes, particularly the measurement of pressures capable of considerable variations.

According to the invention, the device is characterized in that a resetting means of the force balance is made of several winding units with the number of turns set according to a given ratio, said windings being connected to a power supply and to a load through a driven amplifier, and switches being designed for the selective connection of any number of said winding units in the circuit of said load.

Besides, the invention also extends to the working out of a force balance for the measurement of differential pressures and allows, by the operation thereof, an easy and economical construction of said balance.

Various other features of the invention appear from the detailed description made hereinafter.

Embodiments of the invention are shown, as non-restrictive examples, on the accompanying drawing.

Figure 1:
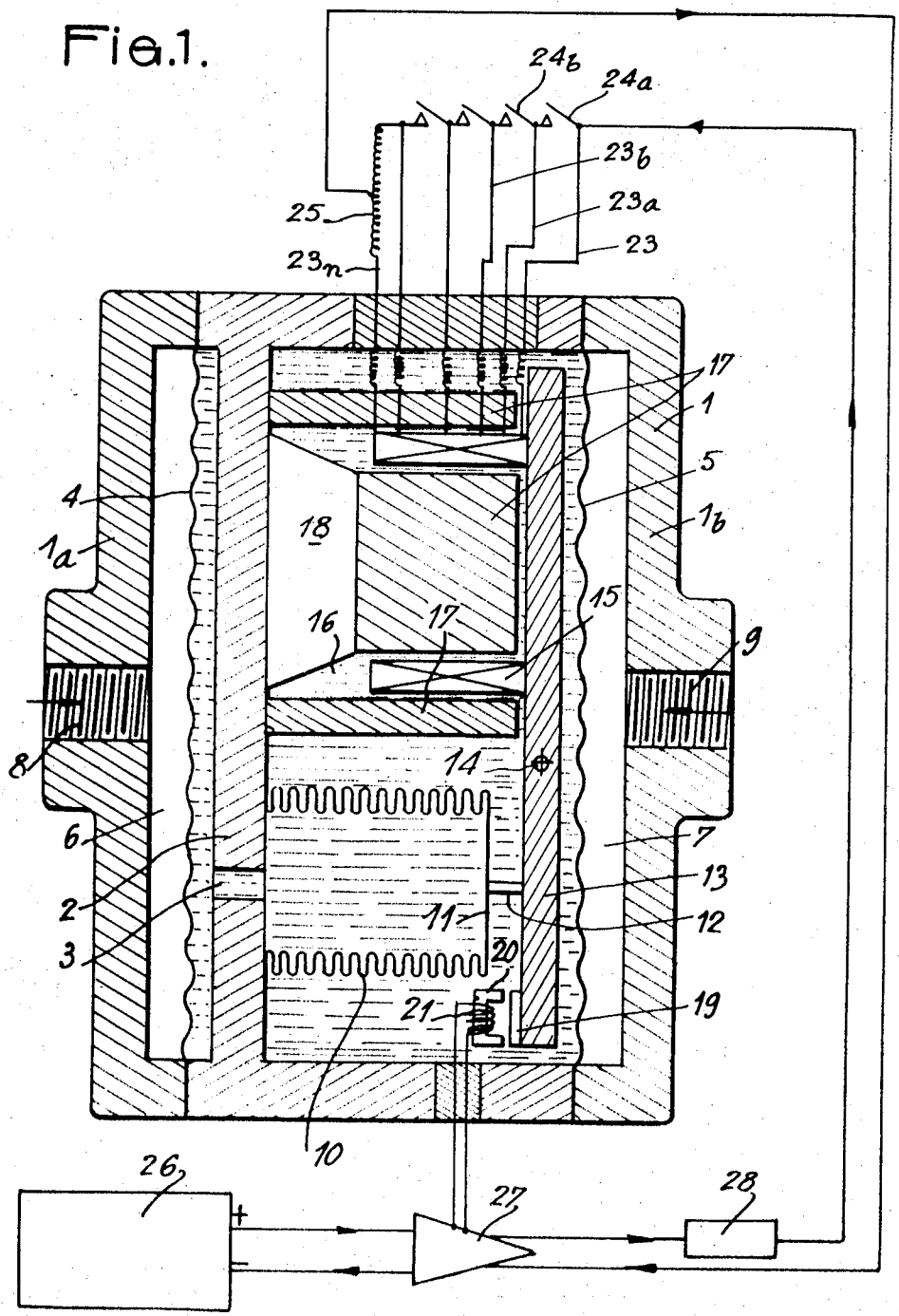
FIG. 1 is a diagrammatic sectional view in elevation of a force balance pressure measurement device.

The force balance for the measurement of differential pressures as shown on FIG. 1, includes a casing 1 wherein is set a transverse partition 2 which bears a port-hole 3. Two diaphragms 4 and 5, respectively, made of distortable membranes define with side walls 1a and 1b, of casing 1 respectively, chambers 6 and 7 designed for the containing of fluids subject to variable pressures which are admitted to said chambers through intake ducts 8 and 9, respectively, which are set in the side walls 1a, 1b of the casing.

It is assumed hereinafter, as an example, that chamber 6 is intended to contain a fluid under a lower pressure than chamber 7, it being understood that it may be the inverse without causing any change in the working of the balance.

A distortable bellows 10 is secured to partition 2 about the port-hole 3 and is closed at its opposite end by a plate 11 which is connected by means of a strut 12 to a rotatable arm 13 serving as a balance-beam, which is mounted on a rod 14 supported, for instance, by casing 1. Arm 13, serving as the balance-beam, carries, at the side opposite to that connected to strut 12, one or several coils 15 which are described in detail hereinafter, said coils being set into the gap 16 of a magnetic circuit similar, for instance, to the magnetic circuit of a loud speaker and whose various components thereof are referenced under number 17, said magnetic circuit being polarized by means of a magnet 18, for instance.

Arm 13, which forms the balance-beam, is equipped, on the side bearing strut 12, with a magnetic armature 19 which is intended to cooperate with a fixed magnetic circuit 20 fitted with a coil 21, and forming thereby a position magnetic detector. The gap between disphragms 4 and 5 is entirely filled up with an incompressible fluid, oil for instance, so that whenever, as explained above, a pressure is created in chamber 7 which is higher than that in chamber 6, diaphragm 5 tends to become distorted, which causes also the distorsion of bellows 10, and, thereby permits part of the incompressible fluid it contains to pass through port-hole 3 causing as a result the distorsion of diaphragm 4. This causes arm 13 to rotate clockwise about rod 14, since said arm is connected to plate 11 through strut 12. Rotation of arm 13 is obviously detected by the magnetic detector including circuit 20 and coil 21 and, as described hereinafter, said detection controls a feeding device for coils 15 so as to reset arm 13 to the initial or null position thereof wherein a zero reading is given by the magnetic detector 20, 21.

Figure 2:
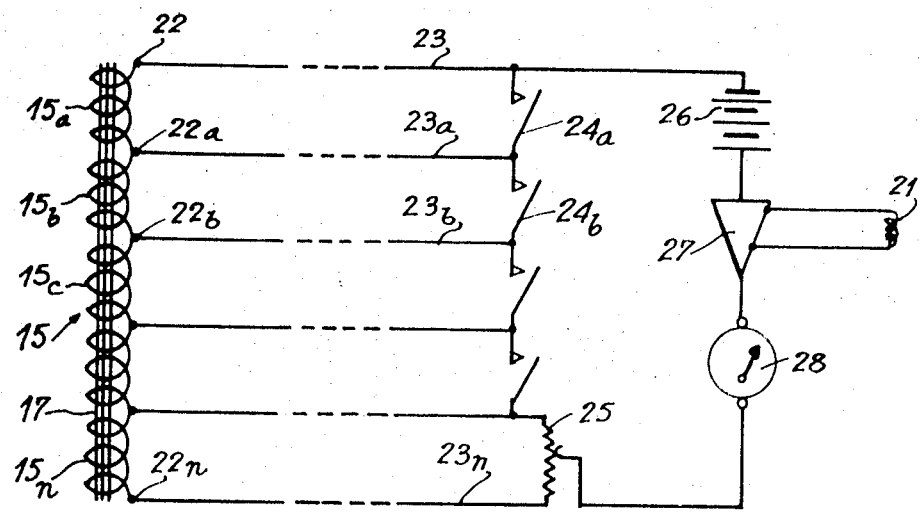
FIG. 2 is an electrical diagram showing an embodiment of a regulation device of the measurement scale for differential pressures measured by the balance shown on FIG. 1.

An embodiment of the device for resetting the arm 13, which forms the balance-beam, to the balancing position thereof, is shown in FIG. 2 which shows coils 15 made up in this case of several winding units 15a, 15b......15n connected in series, i.e. said winding units are defined, for instance, by a single winding separated by multiple plugs 22, 22a, 22b.........22n which are connected by conductors 23, 23a, 23b.......23n to switches 24a, 24b......thereby allowing one to connect up selectively conductors 23 to 23n or to short-circuit successive plugs 22, 22a........22n and thereby connecting up one or more or less perhaps none of the winding units 15a to 15n. Preferably, the number of turns of the successive winding units should be chosen according to a binary ratio, i.e. winding 15a will include a number of $n$ turns, winding 15b a number of $2n$ turns, winding 15c a number of $4n$ turns and so on, so as to allow, by arranging said winding units according to a given order, a plurality of regulations step by step.

As shown in FIGS. 1 and 2, windings 15 are fed from a power supply 26 and through an amplifier 27 which also provides power to the magnetic detector winding 21, hereinabove described, and which is actuated in response to said magnetic detector, in such way that the output current of the amplifier will feed one or several windings 15a – 15n with an intensity high enough to balance the force exerted on bellows 10, the intensity of said current being detected or measured by a detector 28 which may consist of an ammeter or by any other measurement device which may, should it so happen, be a servo-device of a control or checking circuit. Detector 28 should be considered in its broadest sense inasmuch as its function may be a measurement function as well as detection one.

Assuming that force balance, FIG. 1, were to detect and measure differential pressures ranging, for instance, between 0 and 1, the low pressure alone said pressure range being exerted in chamber 6 and the high pressure in chamber 7, then winding unit 15a alone could be used, which is fact, by leaving switch 24a open and closing all the other switches shown in FIG. 2.

If, on the contrary, the pressure difference between chambers 6 and 7 ranges between 0 and 2, then winding unit 15b along may be used by closing switch 24a, while leaving open switch 24b and by closing all the other switches. As a matter of act, this is feasible because the ratio of number of turns between winding units 15a and 15b is a binary ratio, which allows besides, for example, if the pressure difference in chambers 6 and 7 varies from 0 to 3 to use, winding units 15a and 15b, while excluding the others.

Assuming now that the pressure difference in chambers 6 and 7 were to range between zero and a number including a decimal, 3.50 for instance, then, as explained above, winding units 15a and 15b will be switched on and potentiometer 25 will be set in such a position that it will partially short-circuit winding 15n.

It is worth noticing that owing to the arrangement by which all winding units, regardless of their design are housed inside the force balance itself, i.e. more precisely into the space filled up with the incompressible fluid, casing 1 can have sealed openings for entry of the conducting wires without any mechanical part passing through said casing. Furthermore, temperature variations have thus no effect on the windings and any temperature variations said windings may sustain have no effect on the accuracy of the measurements.

Although only one form of the invention has been illustrated, it is obvious that various changes and modifications may be made without departing from the spirit of the invention and all of such changes are contemplated as may come within the scope of the claims. Switches 24a, 24b and so on, particularly, may be replaced by any other technical means, by staples, tommy-bars for instance or even by welding, once the device is finally adjusted. Besides, switches or substitutes thereof may equally be set at various places, on the casing, for instance, when they are on the outer part thereof or directly on the coil or the balance-beam if they are set inside the casing.

I claim:

1. In a force balance of the type comprising a balance-beam subjected to a displacement in accordance with a change in magnitude of a variable force to be measured and wherein said displacement is measured as a function of the force required to rebalance the beam, the improvement comprising a magnetically operated device for establishing the rebalancing force, said device including a winding comprising a plurality of coils having a predetermined turn ratio and which can be selectively connected in series, the number of coils in series circuit determining the force for rebalancing the balance-beam, switch means associated with each coil for selectively connecting the same into said series circuit, a power supply for feeding said series connected coils, circuit means including an amplifier for connecting the power supply to the series connected coils and means for controlling the amplification factor in proportion to the displacement of said balance-beam.

2. In a force balance as claimed in claim 1 wherein each of said switch means is connected across the end terminals of the appertaining coil.

3. In a force balance as claimed in claim 1 wherein the number of turns of the coils are chosen according to a binary ratio and further comprising a variable resistor connected in parallel to one of said coils whereby the force exerted by said one coil may be adjusted to a value between zero and the maximum force exertable thereby.

4. In a force balance as claimed in claim 1 wherein the coils may be selectively coupled in series and wherein said switches short-circuit said coils when closed and further comprising a variable resistor connected in parallel to one of said coils for adjusting the force exerted by said one coil between zero and the maximum force exertable thereby.

5. In a force balance as claimed in claim 1 wherein said coils are associated with the balance beam and the circuit means including an amplifier also includes a detector for sensing the position of the balance beam.

6. A force balance for determining fluid pressure differentials by a servo-rebalance system comprising a casing having opposed fluid ports therein, two distortable spaced parallel diaphragms mounted in said casing between said fluid ports, a fixed partition between said disphragms provided with a port therethrough, a bellows element mounted on said partition and surrounding said port on one side thereof, a magnetically operated device mounted on the same side of the partition as said bellows for establishing a rebalancing force, a balance-beam pivotally mounted adjacent said bellows and said magnetic device, one arm of said balance-beam being connected to said bellows to actuate same when said beam is pivoted, a plurality of coils connected to the other arm of the beam and having a predetermined turn ratio and which can be selectively connected in series, the number of coils in series circuit determining the force for rebalancing the balance-beam switch means associated with each coil for selectively connecting the same into said series circuit, a power supply connected to an amplifier for feeding said series connected coils, the space between said spaced diaphragms in which said balance-beam, said magnetic device, said plurality of coils and said bellows are disposed being filled with an incompressible liquid, whereby variations in the pressure of the fluid entering one of said fluid ports will distort said spaced diaphragms and thus actuate said balance-beam, and magnetic detector means responsive to movement of said balance beam for controlling the amplification factor of said amplifier and accordingly the current to at least one of said coils to restore the balance-beam to a null position and means for measuring the amount of current required.

* * * * *